United States Patent
Han et al.

(10) Patent No.: US 8,133,518 B2
(45) Date of Patent: Mar. 13, 2012

(54) EDIBLE PLANT OILS FROM WHICH SATURATED FATTY ACIDS WERE REMOVED AND MANUFACTURING PROCESS THEREOF

(75) Inventors: Byung-Hoon Han, Cheonan-si (KR); Mi-Kyung Pyo, Cheonan-si (KR); Eun-Mi Choi, Incheon (KR); Jeong-Won Kim, Cheonan-si (KR)

(73) Assignee: E. S. Biotech. Co., Ltd., Cheonan-si (KR)

( * ) Notice: Subject to any disclaimer, the term of this patent is extended or adjusted under 35 U.S.C. 154(b) by 599 days.

(21) Appl. No.: 12/305,364

(22) PCT Filed: Jun. 14, 2007

(86) PCT No.: PCT/KR2007/002865
§ 371 (c)(1), (2), (4) Date: Dec. 17, 2008

(87) PCT Pub. No.: WO2007/148889
PCT Pub. Date: Dec. 27, 2007

(65) Prior Publication Data
US 2009/0226593 A1 Sep. 10, 2009

(30) Foreign Application Priority Data

Jun. 22, 2006 (KR) .......... 10-2006-0056521
Mar. 23, 2007 (KR) .......... 10-2007-0028768

(51) Int. Cl.
*A23D 9/04* (2006.01)
*C11C 3/10* (2006.01)
(52) U.S. Cl. .......... 426/417; 554/30
(58) Field of Classification Search .......... 426/417; 554/30
See application file for complete search history.

(56) References Cited

U.S. PATENT DOCUMENTS 4,004,041 A * 1/1977 Koslowsky .......... 426/601
5,151,291 A * 9/1992 Tokairin et al. .......... 426/581
6,143,348 A 11/2000 Cain et al.
6,410,078 B1 * 6/2002 Cain et al. .......... 426/606
7,558,791 B2 * 7/2009 Wahl .......... 1/1

FOREIGN PATENT DOCUMENTS

EP 1215274 * 6/2002
JP 07-039302 2/1995
JP 07-0313057 12/1995

OTHER PUBLICATIONS

Chen, T. 2001. JAOCS 78(5)485.*
Abu-Nasr, A. 1954. JAOCS 31:16.*
Swern, D. 1982. Bailey's Industrial Oil and Fat Products, vol. 2, 4th edition. John Wiley & Sons, New York. p. 122-129, 147-164.*
International Search Report mailed Oct. 17, 2007 for PCT/KR2007/002865.

* cited by examiner

*Primary Examiner* — Carolyn Paden
(74) *Attorney, Agent, or Firm* — The PL Law Group, PLLC

(57) ABSTRACT

The present invention is concerned with an edible plant oils from which saturated fatty acids were removed and manufacturing process thereof. In order to remove saturated fatty acids from the edible plant oils; 1) Saturated and unsaturated fatty acids bound on same triglyceride molecules of edible plant oils were segregated each other as alkylesters of fatty acids by conventional transesterification reaction in which edible plant oils were treated with large excess of absolute $C_1$~$C_8$ alkanol under the presence of catalytic amount of alkali- or alkali-earth metal-$C_1$~$C_8$ alkoxide. 2) The alkyl-esters of mixed fatty acids were treated with $C_1$~$C_8$ alkanol solution of urea to remove the alkylester of saturated fatty acids by conventional fractional crystallization as urea complexes of saturated fatty acid-alkylesters. 3) Finally the resulting alkylesters of unsaturated fatty acids, obtained by removal of saturated fatty acids by urea complexation procedure, was converted to reconstructed triglyceride oil to give edible plant oils completely devoid of saturated fatty acids. This new manufacturing process could be successfully applied to following 22 kinds of edible plant; 1) corn oil, 2) soybean oil, 3) rapeseed oil, 4) grape seed oil, 5) flaxseed oil, 6) sesame oil, 7) olive oil, 8) perilla oil 9) wall nut oil, 10) pine-nut oil, 11) peanuts oil, 12) sunflower oil, 13) safflower oil, 14) cotton seed oil, 15) palm oil, 16) hot pepper oil, 17) rice bran oil, 18) pumpkin oil, 19) green tea seed oil, 20) almond oil, 21) evening primrose oil and 22) hazelnut oil.

5 Claims, No Drawings

EDIBLE PLANT OILS FROM WHICH SATURATED FATTY ACIDS WERE REMOVED AND MANUFACTURING PROCESS THEREOF

CROSS REFERENCE TO RELATED APPLICATION

This application claims the priority of Korean Patent Application No. 10-2006-0056521, filed on Jun. 22, 2006 and the priority of Korean Patent Application No. 10-2007-0028768, filed on Mar. 23, 2007 in the KIPO (Korean Intellectual Property Office), the disclosure of which are incorporated herein in their entirety by reference. Further, this application is the National Phase application of International Application No. PCT/KR2007/002865, filed Jun. 14, 2007, which designates the United States and was published in English. Each of these applications is hereby incorporated by reference in their entirety into the present application.

TECHNICAL FIELD

It is well known facts that saturated fatty acids in the lipid-rich food especially from warm blooded animals will have risk to elicit various cardiovascular diseases. It is also well known facts that plant oils bad been used as edible oils without any further processing due to the relatively low content of saturated fatty acids and that warm blooded animal fats are less frequently used for the food processing. It is well known fact that the polyunsaturated fatty acids (PUFA) in our diet reduce the blood level of cholesterol including neutral lipid level and further that saturated fatty acids are antagonizing the beneficial activity of PUFA by elevating both parameter with twice potency compared to the lowering activity of PMFA. Hence it is necessary to establish a new method to remove saturated fatty acids from edible plant oils.

BACKGROUND ART

The present invention is concerned with edible plant oils from which saturated fatty acids were removed and a manufacturing process thereof.

We can find an equimolar mixture of triolein and trilinolein listed in Sigma—Aldrich Reagent Catalogue. This mixture of triglycerides composed of two unsaturated fatty acids, i.e., oleic acid and linoleic acid must be prepared by mixing two synthetically obtained triglycerides, i.e. triolein and trilinolien in-order to use as reference standards, for the retention time in the HPLC analysis of triglycerides and not prepared by elimination of saturated fatty acids from edible plant oils.

Our previous invention on flaxseed oil (Korean patent Na. 10-0663063, date; 2006, Dec. 22) was also concerned with the elimination of saturated fatty acids together with two other toxic components in the oil and it/was also composed of three steps i.e., 1) saponification, 2) urea complexation and 3) reconstruction of triglyceride via conventional condensing process of fatty-acyl chloride with glycerine. The present invention differs from our previous invention in respect to the facts that 1) saponification in our previous invention is replaced by transesterification and 2) reconstruction of triglyceride via acyl-halide process is replaced by interesterification of alkylester of unsaturated fatty acids with triacetin.

DISCLOSURE OF INVENTION

Technical Problem

Generally, saturated and unsaturated fatty acids are bound in a mixed state on same triglyceride molecules, since they are randomly distributed in the triglyceride molecules. In other words, it will have rare possibilities of the presence of triglycerides composed of only one kind of saturated fatty acids as tripalmitin or tristearin in case when the content of saturated fatty acids in the oil are relatively low as the cases of edible plant oils. Therefore the conventional physical processes as low temperature fractional crystallization are not applicable for the elimination of saturated fatty acids from edible plant oils.

Technical Solution

In order to remove saturated fatty acids from plant oil, following three conventional organic reactions are combined to establish a new simple and economic procedure; 1) saturated and unsaturated fatty acids bound to same triglyceride molecules should be segregated each other by transesterification reaction producing the mixture of alkyl-esters of saturated and unsaturated fatty acids, 2) the resulting alkyl-esters of saturated fatty acids are completely removed by fractional crystallization of urea complex of fatty acid-alkylesters and 3) reconstruction of triglyceride oil by interesterification reaction of alkyl-ester of unsaturated fatty acids with triacetin. The above three reactions; i.e., transesterification, urea complexation of fatty acids and interesterification are all conventional processes in the lipid chemistry, however, these three conventional chemical processes had never been combined to remove saturated fatty acid from edible plant oils. In the previous references (U.S. Pat. No. 05,434,278) of the interesterification reaction, it was conventionally applied for the mixture of triglycerides of long chain fatty acid and shorter chain fatty acids for the randomization of fatty-acid distribution in the triglyceride molecules in order to modify such physical properties as melting point of fat, but not for the reconstruction of triglycerides starting from unsaturated fatty acid-alkylesters for the purpose of complete elimination of saturated fatty acids from edible plant oils.

The present invention differs from our previous invention in respect to the facts that 1) saponification in our previous invention is replaced by transesterification and 2) reconstruction of triglyceride via acyl-halide process is replaced by interesterification of alkylester of unsaturated fatty acids with triacetin. This new invention is easier and more convenient in the reaction processes and also more economic to produce edible plant oils in which saturated fatty acids are completely removed.

Mode for the Invention

Our previous invention on flaxseed oil (Korean patent No. 10-0663063, date; 2006, Dec. 22), was also concerned with the elimination of saturated fatty acids together with two other toxic components in the oil and it was also composed of three steps i.e., 1) saponification, 2) urea complexation and 3) reconstruction of triglyceride via conventional condensing process of fatty-acyl chloride with glycerine. For the edible plant oils it has no need to eliminate or destroy any toxic components, hence it is necessary to establish some more convenient and economic procedure for the elimination of saturated fatty acids.

When we compare the processes of two inventions, i.e., the former invention for flaxseed oil and the present invention for edible plant oils, the present invention differs from our previous invention in respect to the facts that 1) the saponification reaction in our former invention is replaced by the transesterification in the present invention to produce the mixture of alkylesters of fatty acids instead of the mixture of free fatty acids, 2) urea complexation of fatty acids is replaced by urea complexation of fatty acid-alkylester and 3) reconstruction of triglyceride via fatty-acyl-chloride activation through the reaction with oxalyl chloride is replaced by interesterification reaction of alkylesters of unsaturated fatty acids with triacetin under alkali metal or alkali-earth metal-$C_1$~$C_8$ alkoxide catalyst. This new invention is easier and more convenient in the reaction processes and also more economic to produce edible plant oils in which saturated fatty acids are completely removed. The market price of edible plant oil is very cheap and the quantity of consumption must be very great, hence simpler process for the production of the invented product would be better and the production cost of invented product should be as low as possible. The most cost effective step of the present process is the transesterification step where the use of excessive amount of absolutely anhydrous $C_1$~$C_8$ alkanol is obligatory. At the end of transesterification reaction, the neutralization of alkali-metal or alkali-earth metal $C_1$~$C_8$ alkoxide to destroy its catalytic activity by glacial acetic acid instead of dilute mineral acid enables us to recover absolute alkanol without any compositional changes. This simple modification will be cost reducing process, since the recovered absolute alkanol will be recycled for same purpose. The three step chemical treatments for the edible oil to produce the invented product are not employing any chemical changes as oxidation or reduction on chemical entities of the edible oils except the partner change of ester bond and should not give any chemical remainings behind. More important things are that the taste and flavor of the invented product should be acceptable for human consumption and also that the chemical reactions for the invented production process should not alter the chemical entities of oil except for the elimination of saturated fatty acids and that no chemical residues should be remained after the necessary chemical treatments. All chemical reagent including urea and triacetin used in this invention may be acceptable as the chemical reagent for the food processing, since these are found in GRAS-list of U.S.-FDA (Generally Recognized As Safe for Food).

The present invention, concerned with the preparation of edible plant oils devoid of saturated fatty acids, consists of following three steps of conventional chemical processes:

1) In the first step (step-A; transesterification), edible plant oil is treated to produce alkyl-esters of fatty acids by stirring with large excess of anhydrous $C_1$~$C_8$ alkanol, preferably ethanol), and catalytic amount of alkali- or alkali-earth metal-$C_1$~$C_8$ alkoxide (preferably 0.01-0.1 mol % of sodium or potassium ethoxide) until the interfaces of oil in alkanol will be disappeared. The catalytic activity of sodium or potassium alkoxide is destroyed by the addition of equivalent amount of organic or inorganic acid at the end of transesterification reaction and then removed the absolute alkanol by distillation to obtain the mixture of alkyl-esters of fatty acids. The neutralization of reaction mixture by glacial acetic acid instead of dilute mineral acids such as d-HCl or d-$H_2SO_4$ ensures the recovery of absolute alkanol for next uses by which the production cost will be highly reduced.

2) In the second step (step-B), the mixture of alkyl-esters of fatty acids was treated with ethanol solution of urea in order to eliminate the urea complex of saturated fatty acid-alkylester as crystal. After removal of crystalline urea complex of saturated fatty acid-alkylesters by filtration, unsaturated fatty acid-alkylester could be obtained from the filtrate by conventional after-treatment as acidification, partition to organic solvent and followed by concentration.

3) In the final step of this invention (step-C), the reconstruction of edible plant oil by triglyceride bond formation was accomplished by interesterification reaction in which the three molar alkylester of unsaturated fatty acids were mixed with one mole triglycerides of $C_1$~$C_8$ fatty acid selected from the list of $C_1$~$C_8$-fatty acids (preferably triacetin) together with catalytic amount of alkali- or alkali earth metal-alkoxide and heated in an oil-bath (95~175° C.) under reduced pressure until the distillation of ethylacetate is ceased. The reaction mixture is neutralized by d-HCl or d-$H_2SO_4$, extracted with hexane and concentrated to obtain final product of this invention.

In order to confirm the correct reconstruction of edible triglyceride oil, the fatty acid composition of the final invented product was analyzed by GLC, and also confirmed the disappearance of alkyl proton peaks in the proton NMR. The proton-NMR peaks of invented product were reasonably assigned to the mixture of unsaturated fatty acids and alkoxy protons of glycerol moiety of reconstructed triglyceride oil.

The present invention is illustrated in detail with the following examples and experiments. The list of edible plant oils tested for the applicability of present invention is as followings; 1) corn oil, 2) bean oil, 3) rapeseed oil, 4) grape seed oil, 5) flaxseed oil, 6) sesame oil, 7) olive oil, 8) perilla oil 9) wall nut oil, 10) pine-nut oil, 11) peanuts oil, 12) sunflower oil, 13) safflower oil, 14) cotton seed oil, 15) palm oil, 16) hot pepper oil, 17) rice bran oil, 18) pumpkin oil, 19) green tea seed oil, 20) almond oil, 21) evening primrose oil and 22) Hazelnut oil. However, these examples do not limit the scope of the present invention. The alkanol in the present invention denotes one of primary or secondary alkanol selected from $C_1$~$C_8$ alkanol.

Experiment 1

Experiment 1-1: Elimination of Saturated Fatty Acids from Corn Oil

The reaction mixture of 50.34 g corn oil, completely dehydrated in advance by heating in 105° C. silicon oil-bath under reduced pressure, 250 µl absolute ethanol and catalytic amount (250 µl) of 28%-sodium-methoxide solution was mixed well by magnetic stirring for 5 hours at room temperature until the homogenous solution was obtained due to the progress of transesterification reaction. The catalytic activity of sodium methoxide in the reaction mixture was destroyed by the addition of 70 µl glacial acetic acid. To the reaction mixture 80 g urea and 250 µl ethanol was added and heated in a water-bath until the urea is completely dissolved and stored overnight at room temperature to crystallize urea complex of saturated fatty acids-methyl ester. The crystalline urea complexes were filtered off by suction. The filtrate was concentrated to obtain amorphous urea complex of unsaturated fatty acid-methyl ester and to recover absolute ethanol for the next recycling. The acidification of amorphous urea complex with d-HCl followed by hexane extraction and concentration gave 32.64 g methyl ester of unsaturated fatty acids. When the fatty acid composition of corn oil was assayed by GLC before and after the elimination of saturated fatty acids as shown in Table-1, saturated fatty acids of corn oil were completely eliminated together with a part of oleic acid, hence the content of linoleic acid was rather increased from 48.1% to 76.43%. In order to synthesize reconstructed triglyceride oil by interesterification reaction, 8 g of triacetin and 250 µl of 28% sodium-methoxide solution were added to the above methylester of unsaturated fatty acid and heated to 95~125° C. in a silicone oil bath under reduced pressure (<50 mmHg) to remove ethyl-acetate produced by the interesterification. After the cease of ethyl-acetate gas evolvement, the reaction mixture was neutralized with 70 µl glacial acetic acid and diluted with water. The resulting triglyceride oil was extracted with hexane and finally concentrated to give 32.60 g triglyceride corn oil composed of only unsaturated fatty acids.

Experiment 1-2: Elimination of Saturated Fatty Acids from Soybean Oil

A portion of soybean oil (50.34 g) was treated by the same experimental procedures as described in Experiment 1-1 to give 31.34 g of reconstructed triglyceride oil which is completely free of saturated fatty acids. The fatty acid composition of reconstructed triglyceride soybean oil was analyzed by GLC as described in [Experiment 2] and the data are tabulated in Table-1.

Experiment 1-3: Elimination of Saturated Fatty Acids from Rapeseed Oil

A portion of rapeseed oil (50.91 g) was treated by the same experimental procedures as described in Experiment 1-1 to give 42.62 g of reconstructed triglyceride oil which is completely free of saturated fatty acids. The fatty acid composition of reconstructed triglyceride rapeseed oil was analyzed by GLC as described in [Experiment 2] and the data are tabulated in Table-1.

Experiment 1-4: Elimination of Saturated Fatty Acids from Grapeseed Oil

A portion of grapeseed oil (50.21 g) was treated by the same experimental procedures as described in Experiment 1-1 to give 38.04 g of reconstructed triglyceride oil which is completely free of saturated fatty acids. The fatty acid composition of reconstructed triglyceride grapeseed oil was analyzed by GLC as described in [Experiment 2] and the data are tabulated in Table-1.

Experiment 1-5: Elimination of Saturated Fatty Acids from Flaxseed Oil

A portion of flaxseed oil (49.86 g) was treated by the same experimental procedures as described in Experiment 1-1 to give 42.10 g of reconstructed triglyceride oil which is completely free of saturated fatty acids. However, this sample needed increased amount of sodium-alkoxide and glacial acetic acid respectively 320 and 90 µl for both transesterification and interesterification reaction. The fatty acid composition of reconstructed triglyceride flaxseed oil was analyzed by GLC as described in [Experiment 2] and the data are tabulated in Table-1.

Experiment 1-6: Elimination of Saturated Fatty Acids from Sesame Seed Oil

A portion of sesame seed oil (50.71 g) was treated by the same experimental procedures as described in Experiment 1-1 to give 43.02 g of reconstructed triglyceride oil which is completely free of saturated fatty acids. This sample, however, needed increased amount of sodium-alkoxide and glacial acetic acid respectively 850 and 240 µl for both transesterification and interesterification reaction. The fatty acid composition of reconstructed triglyceride sesame oil was analyzed by GLC as described in [Experiment 2] and the data are tabulated in Table-1.

Experiment 1-7: Elimination of Saturated Fatty Acids from Olive Oil

A portion of olive oil (50.09 g) was treated by the same experimental procedures as described in Experiment 1-1 to give 29.60 g of reconstructed triglyceride oil which is completely free of saturated fatty acids. This sample needed increased amount of sodium-alkoxide and glacial acetic acid respectively 350 and 100 µl for both transesterification and interesterification reaction. The fatty acid composition of reconstructed triglyceride olive oil was analyzed by GLC as described in [Experiment 2] and the data are tabulated in Table-1.

Experiment 1-8: Elimination of Saturated Fatty Acids from Perilla Oil

A portion of perilla oil (50.33 g) was treated by the same experimental procedures as described in Experiment 1-1 to give 41.35 g of reconstructed triglyceride oil which is completely free of saturated fatty acids. This sample needed increased amount of sodium-alkoxide and glacial acetic acid respectively 400 and 110 µl for both transesterification and interesterification reaction. The fatty acid composition of reconstructed triglyceride perilla oil was analyzed by GLC as described in [Experiment 2] and the data are tabulated in Table-1.

Experiment 1-9: Elimination of Saturated Fatty Acids from Walnut Oil

A portion of walnut oil (50.06 g) was treated by the same experimental procedures as described in Experiment 1-1 to give 29.86 g of reconstructed triglyceride oil which is completely free of saturated fatty acids. This sample needed increased amount of sodium-alkoxide and glacial acetic acid respectively 400 and 110 µl for both transesterification and interesterification reaction. The fatty acid composition of reconstructed triglyceride walnut oil was analyzed by GLC as described in [Experiment 2] and the data are tabulated in Table-1.

Experiment 1-10: Elimination of Saturated Fatty Acids from Pine-Nut Oil

A portion of pine-nut oil (50.34 g) was treated by the same experimental procedures as described in Experiment 1-1 to give 39.28 g of reconstructed triglyceride oil which is completely free of saturated fatty acids. This sample needed increased amount of sodium-alkoxide and glacial acetic acid respectively 300 and 80 µl for both transesterification and interesterification reaction. The fatty acid composition of reconstructed triglyceride pine-nut oil was analyzed by GLC as described in [Experiment 2] and the data are tabulated in Table-1.

Experiment 1-11: Elimination of Saturated Fatty Acids from Peanut Oil

A portion of peanut oil (50.29 g) was treated by the same experimental procedures as described in Experiment 1-1 to give 27.22 g of reconstructed triglyceride oil which is completely free of saturated fatty acids. This sample needed increased amount of sodium-alkoxide and glacial acetic acid respectively 400 and 110 µl for both transesterification and interesterification reaction. The fatty acid composition of reconstructed triglyceride peanut oil was analyzed by GLC as described in [Experiment 2] and the data are tabulated in Table-1.

Experiment 1-12: Elimination of Saturated Fatty Acids from Sunflower Oil

A portion of sunflower oil (50.17 g) was treated by the same experimental procedures as described in Experiment 1-1 to give 35.19 g of reconstructed triglyceride oil which is completely free of saturated fatty acids. This sample needed increased amount of sodium-alkoxide and glacial acetic acid respectively 500 and 140 µl for both transesterification and interesterification reaction. The fatty acid composition of reconstructed triglyceride sunflower oil was analyzed by GLC as described in [Experiment 2] and the data are tabulated in Table-1.

Experiment 1-13: Elimination of Saturated Fatty Acids from Safflower Oil

A portion of safflower oil (50.18 g) was treated by the same experimental procedures as described in Experiment 1-1 to give 28.50 g of reconstructed triglyceride oil which is completely free of saturated fatty acids. This sample needed increased amount of sodium-alkoxide and glacial acetic acid respectively 600 and 170 μl for both transesterification and interesterification reaction. The fatty acid composition of reconstructed triglyceride safflower oil was analyzed by GLC as described in [Experiment 2] and the data are tabulated in Table-1.

Experiment 1-14: Elimination of Saturated Fatty Acids from Cotton Seed Oil

A portion of cotton seed oil (50.01 g) was treated by the same experimental procedures as described in Experiment 1-1 to give 25.11 g of reconstructed triglyceride oil which is completely free of saturated fatty acids. This sample needed increased amount of sodium-alkoxide and glacial acetic acid respectively 200 and 50 μl for both transesterification and interesterification reaction. The fatty acid composition of reconstructed triglyceride cotton oil was analyzed by GLC as described in [Experiment 2] and the data are tabulated in Table-1.

Experiment 1-15: Elimination of Saturated Fatty Acids from Palm Oil

The reaction mixture of 51.01 g palm oil, completely dehydrated in advance by heating in 105° C. silicon oil-bath under reduced pressure, 250 μl absolute ethanol and catalytic amount (850 μl) of 21%-sodium-ethoxide solution was mixed well by magnetic stirring for 5 hours at room temperature until the homogenous solution was obtained due to the progress of transesterification reaction. The catalytic activity of sodium ethoxide in the reaction mixture was destroyed by the addition of 200 μl glacial acetic acid. To the reaction mixture 260 g urea and 500 μl ethanol was added and heated in a water-bath until the urea is completely dissolved and stored overnight at room temperature to crystallize urea complex of saturated fatty acids-ethylester. The crystalline urea complexes were filtered off by suction. The filtrate was concentrated to obtain amorphous urea complex of unsaturated fatty acid-ethylester and to recover absolute ethanol for the next recycling. The acidification of amorphous urea complex with d-HCl followed by hexane extraction and concentration gave 3.4 g ethylester of unsaturated fatty acids. When the fatty acid composition of palm oil was assayed by GLC before and after the elimination of saturated fatty acids as shown in Table-1, saturated fatty acids of palm oil were completely eliminated together with a part of oleic acid, hence the content of linoleic acid was rather increased from 10.40% to 66.88%. In order to synthesize reconstructed triglyceride oil by interesterification reaction, one gram of triacetin and 50 μl of 21%-sodium-ethoxide solution were added to the above ethylester of unsaturated fatty acid and heated to 95~125° C. in a silicone oil bath under reduced pressure (<50 mmHg) to remove ethyl-acetate produced by the interesterification. After the cease of ethyl-acetate gas evolvement, the reaction mixture was neutralized with 15 μl glacial acetic acid and diluted with water. The resulting triglyceride oil was extracted with hexane and finally concentrated to give 2.91 g triglyceride oil composed of only unsaturated fatty acids.

Experiment 1-16: Elimination of Saturated Fatty Acids from Hot Pepper Oil

A portion of hot pepper oil (50.03 g) was treated by the same experimental procedures as described in Experiment 1-1 to give 28.56 g of reconstructed triglyceride oil which is completely free of saturated fatty acids. This sample needed increased amount of sodium-alkoxide and glacial acetic acid respectively 400 and 110 μl for both transesterification and interesterification reaction. The fatty acid composition of reconstructed triglyceride hot pepper oil was analyzed by GLC as described in [Experiment 2] and the data are tabulated in Table-1.

Experiment 1-17: Elimination of Saturated Fatty Acids from Rice Bran Oil

A portion of rice bran oil (50.28 g) was treated by the same experimental procedures as described in Experiment 1-1 to give 29.26 g of reconstructed triglyceride oil which is completely free of saturated fatty acids. This sample needed increased amount of sodium-alkoxide and glacial acetic acid respectively 400 and 110 μl for both transesterification and interesterification reaction. The fatty acid composition of reconstructed triglyceride rice bran oil was analyzed by GLC as described in [Experiment 2] and the data are tabulated in Table-1

Experiment 1-18: Elimination of Saturated Fatty Acids from Pumpkin Oil

A portion of pumpkin seed oil (50.96 g) was treated by the same experimental procedures as described in Experiment 1-1 to give 36.67 g of reconstructed triglyceride oil which is completely free of saturated fatty acids. This sample, however, needed increased amount of sodium-alkoxide and glacial acetic acid respectively 300 and 80 μl for both transesterification and interesterification reaction. The fatty acid composition of reconstructed triglyceride pumpkin seed oil was analyzed by GLC as described in [Experiment 2] and the data are tabulated in Table-1.

Experiment 1-19: Elimination of Saturated Fatty Acids from Green Tea Seed Oil

A portion of green tea seed oil (50.35 g) was treated by the same experimental procedures as described in Experiment 1-1 to give 28.68 g of reconstructed triglyceride oil which is completely free of saturated fatty acids. This sample needed increased amount of sodium-alkoxide and glacial acetic acid respectively 400 and 110 μl for both transesterification and interesterification reaction. The fatty acid composition of reconstructed triglyceride green tea seed oil was analyzed by GLC as described in [Experiment 2] and the data are tabulated in Table-1.

Experiment 1-20: Elimination of Saturated Fatty Acids from Almond Oil

A portion of almond oil (50.75 g) was treated by the same experimental procedures as described in Experiment 1-1 to give 41.78 g of reconstructed triglyceride oil which is completely free of saturated fatty acids. This sample needed increased amount of sodium-alkoxide and glacial acetic acid respectively 200 and 50 μl for both transesterification and interesterification reaction. The fatty acid composition of reconstructed triglyceride almond oil was analyzed by GLC as described in [Experiment 2] and the data are tabulated in Table-1.

Experiment 1-21: Elimination of Saturated Fatty Acids from Evening Primrose Oil (EPO)

A portion of evening primrose oil (50.23 g) was treated by the same experimental procedures as described in Experiment 1-1 to give 42.34 g of reconstructed triglyceride oil which is completely free of saturated fatty acids. This sample, however, needed increased amount of sodium-alkoxide and glacial acetic acid respectively 300 and 80 μl for both transesterification and interesterification reaction. The fatty acid composition of reconstructed triglyceride evening primrose oil was analyzed by GLC as described in [Experiment 2] and the data are tabulated in Table-1.

Experiment 1-22: Elimination of Saturated Fatty Acids from Hazelnut Oil

A portion of hazelnut oil (50.48 g) was treated by the same experimental procedures as described in Experiment 1-1 to give 32.14 g of reconstructed triglyceride oil which is completely free of saturated fatty acids. This sample needed increased amount of sodium-alkoxide and glacial acetic acid respectively 400 and 110 μl for both transesterification and interesterification reaction. The fatty acid composition of reconstructed triglyceride hazelnut oil was analyzed by GLC as described in [Experiment 2] and the data are tabulated in Table-1.

All edible plant oils were treated by the same ways as described above in Experiment 1-1 except that the quantities of urea used to eliminate saturated fatty acids were appropriately modified depending on the total quantities of saturated fatty acid contents in the oils.

Experiment 2

Gaschromatographic Analysis of Fatty Acid Composition of Oils

Each twenty microliter of edible plant oils and their reconstructed triglyceride oil were mixed with 100 μl of 28% sodium methoxide in MeOH and mixed well with 100 μl hexane and centrifuged for 10 minutes at 12000 rpm. Each five microliters hexane-layer was taken and diluted with 95 μl hexane. Each ten microliters portion of diluted hexane layer was injected for the gas-chromatographic analysis. Gas-chromatographic conditions; Hewlett-Packard 5890-11 Series (HP Co., Wilmington, Del., USA), detector; FID, column; DB-23 capillary (60 m, 0.25 mm ID, 0.25 μl), temp; oven; initial 130° C., programmed 2.7° C./min. to final 230° C., injector; 270° C., carrier gas; nitrogen, flow rate; 30 μl/min. The results of GLC-analysis for each untreated edible plant oil and each reconstructed triglyceride oils are tabulated in Table-1.

[PMR peak assignments for the reconstructed flaxseed triglyceride oil obtained by the elimination of saturated fatty acid]; The proton-NMR spectra of reconstructed flaxseed triglyceride oil was measured and assigned carefully for all proton peaks to the partial structure of composing fatty acids. Integration of every peak areas is correctly supporting the composition of unsaturated fatty acids in the oil. NMR, 300 MHz (TMS, $CDCl_3.\delta$); 0.96 (methyl, 9H, t, J=7.5 Hz), 1.296 (aliphatic methylenes, 36-38H, br, s.), 1.497 (carboxyl adjacent methylene, 6H, t, J=7.5 Hz), 2.046 (olefine adjacent methylene, 12H, m), 2.302 (=CHCH$_a$H$_b$CH=, 6H, m), 2.795 (=CHCH$_a$H$_b$CH=, 6H, m), 4.136 (glyceryl CH$_a$H$_b$O—, 2H, m, J=6.0 Hz, 16 Hz), 4.287 (glyceryl CH$_a$H$_b$O—, 2H, m, J=6.0 Hz, 16 Hz), 5.259 (glyceryl CH$_2$(O—)CH(O—)CH$_2$(O—), 2H, m, J=6.0 Hz, 16 Hz), 5.35 (olefinic, =CH—, 14-16H, m). The structural assignments of the above proton peaks are well accorded to the compositions (GLC-data) of unsaturated fatty acids of finally reconstructed triglyceride.

TABLE 1

Fatty acid composition of various edible plant oils before and after the elimination of saturated fatty acids(%, w/w); saturated fatty acid contents are the sum of stearic acid and palmitic acid

| Vegetable oils | Treatment | Sample/ recovery | Saturated fatty acids | Oleic acid | Linoleic acid | Linolenic acid |
|---|---|---|---|---|---|---|
| Corn oil | before | 50.29 g | 14.80% | 33.30% | 48.10% | 0.80% |
| | after | 32.60 g | 0.00% | 22.30% | 76.43% | 1.27% |
| Bean oil | before | 50.34 g | 14.70% | 23.00% | 45.20% | 6.50% |
| | after | 31.34 g | 0.00% | 20.73% | 51.70% | 8.21% |
| Rapeseed | before | 50.91 g | 6.80% | 49.56% | 24.10% | 9.20% |
| | after | 42.63 g | 0.00% | 53.74% | 28.74% | 11.25% |
| Grape seed | before | 50.21 g | 10.08% | 18.40% | 68.80% | 0.00% |
| | after | 38.04 g | 0.00% | 12.01% | 87.99% | 0.00% |
| Flaxseed | before | 49.86 g | 9.40% | 21.10% | 15.00% | 52.40% |
| | after | 42.13 g | 0.00% | 11.79% | 16.67% | 69.74% |
| Sesame oil | before | 50.71 g | 15.20% | 38.30% | 45.40% | 0.00% |
| | after | 38.10 g | 0.00% | 44.13% | 55.87% | 0.00% |
| Olive oil | before | 50.09 g | 12.50% | 74.10% | 3.80% | 0.00% |
| | after | 29.60 g | 0.00% | 87.04% | 10.10% | 0.00% |
| Perilla oil | before | 50.33 g | 8.70% | 16.38% | 16.60% | 58.32% |
| | after | 41.35 g | 0.00% | 12.61% | 19.34% | 66.30% |
| Walnut oil | before | 50.06 g | 7.90% | 22.40% | 58.30% | 8.10% |
| | after | 29.86 g | 0.00% | 17.84% | 70.83% | 10.28% |
| Pine-nut oil | before | 50.34 g | 7.40% | 27.30% | 45.20% | 0.00% |
| | after | 39.28 g | 0.00% | 27.52% | 50.43% | 0.00% |
| Peanut oil | before | 50.29 g | 13.70% | 43.10% | 35.40% | 0.00% |
| | after | 27.22 g | 0.00% | 51.60% | 48.40% | 0.00% |
| Sunflower oil | before | 50.17 g | 11.40% | 19.70% | 66.60% | 0.00% |
| | after | 35.19 g | 0.00% | 22.00% | 74.40% | 0.00% |
| Safflower oil | before | 50.18 g | 8.60% | 11.90% | 79.50% | 0.00% |
| | after | 28.50 g | 0.00% | 10.48% | 85.82% | 0.00% |
| Cotton seed oil | before | 50.01 g | 21.80% | 14.50% | 46.10% | 0.00% |
| | after | 25.11 g | 0.00% | 15.71% | 84.29% | 0.00% |
| Palm oil | before | 51.01 g | 45.40% | 39.30% | 10.40% | 0.00% |
| | after | 2.91 g | 0.00% | 33.12% | 66.88% | 0.00% |
| Hot pepper | before | 50.03 g | 19.37% | 18.68% | 57.54% | 4.41% |
| | after | 28.56 g | 0.00% | 10.34% | 81.41% | 8.25% |
| Rice bran oil | before | 50.28 g | 16.90% | 42.70% | 39.30% | 1.10% |
| | after | 29.26 g | 0.00% | 32.54% | 64.31% | 3.15% |
| Pumpkin oil | before | 50.96 g | 9.00% | 34.34% | 49.27% | 7.39% |
| | after | 36.67 g | 0.00% | 28.04% | 61.05% | 10.91% |
| Green tea seed oil | before | 50.35 g | 16.50% | 57.07% | 24.26% | 2.17% |
| | after | 28.68 g | 0.00% | 48.36% | 48.52% | 3.12% |
| Almond oil | before | 50.75 g | 5.34% | 77.92% | 16.74% | 0.00% |
| | after | 41.78 g | 0.00% | 73.75% | 26.25% | 0.00% |

TABLE 1-continued

Fatty acid composition of various edible plant oils before and after the elimination of saturated fatty acids(%, w/w); saturated fatty acid contents are the sum of stearic acid and palmitic acid

| Vegetable oils | Treatment | Sample/ recovery | Saturated fatty acids | Oleic acid | Linoleic acid | Linolenic acid |
|---|---|---|---|---|---|---|
| EPO | before | 50.23 g | 6.14% | 8.86% | 73.50% | 11.50% |
|  | after | 42.34 g | 0.00% | 5.31% | 78.26% | 16.43% |
| Hazelnut oil | before | 50.48 g | 12.60% | 71.48% | 15.42% | 0.50% |
|  | after | 32.14 g | 0.00% | 64.56% | 34.23% | 1.21% |

Industrial Applicability

Edible plant oils reconstructed only by unsaturated fatty acids from which saturated fatty acids were completely removed by the present invention are very useful as edible plant oil for human beings.

The invention claimed is:

1. A method for preparing edible plant oil comprised of unsaturated fatty acids devoid of saturated fatty acids, the method comprising:

performing a transesterification reaction of the edible plant oil by mixing the edible plant oil with excessive amount of anhydrous $C_1$-$C_8$ alkanol and a catalytic amount of $C_1$-$C_8$ alkoxide of alkali- or alkali-earth metal and stirring the mixture until the oil/alkanol interface is disappeared to prepare alkylester of fatty acids from the edible plant oil, neutralizing the reaction mixture by the addition of equi-molar amount of $C_1$-$C_4$ organic acid or inorganic acid to destroy catalytic activity of the alkoxide after the end of the transesterification reaction, optionally recovering the anhydrous alkanol for recycling by distillation of the neutralized reaction mixture and extracting the remaining residue with an organic solvent to obtain the mixture of alkylesters of saturated and unsaturated fatty acids;

heating the obtained mixture of alkylester of saturated and unsaturated fatty acids with a $C_1$-$C_8$ alkanol solution of urea to form a urea-fatty acid-alkylester and then eliminating a crystalline complex of urea-saturated fatty acid-alkylester complex by filtration, and obtaining an alkylester of unsaturated fatty acids by after-treatment on the filtrate; and mixing three molar amount of the obtained alkylester of unsaturated fatty acids with equimolar amount of $C_1$-$C_8$ fatty acid-triglyceride and a catalytic amount of a $C_1$-$C_8$ alkoxide of alkali- or alkali-earth metal to perform an interesterification reaction and treating the reaction mixture to remove the $C_1$-$C_8$ fatty acid-alkylester produced by the interesterification, neutralizing and extracting the reaction mixture with an organic solvent after the end of the interesterification reaction, and then concentrating the reaction mixture to prepare the edible plant oil comprised of unsaturated fatty acids devoid of saturated fatty acids.

2. A method according to claim 1, wherein the edible plant oil is selected from the group composed of 1) Corn oil, 2) Soybean oil, 3) Rapeseed oil, 4) Grape seed oil, 5) Flaxseed oil, 6) Sesame oil, 7) Olive oil, 8) Perilla oil, 9) Wall nut oil, 10) Pine-nut oil, 11) Peanut oil, 12) Sunflower oil, 13) Safflower oil, 14) Cotton seed oil, 15) Palm oil, 16) Hot pepper oil, 17) Rice bran oil, 18) Pumpkin oil, 19) Tea seed oil, 20) Almond oil, 21) Evening primrose oil (EPO), and 22) Hazelnut oil.

3. A method according to claim 1, wherein the $C_1$-$C_8$ alkoxide of alkali- or alkali-earth metal is selected from the group consisting of sodium alkoxide, lithium alkoxide, potassium alkoxide, magnesium alkoxide and calcium alkoxide.

4. A method according to claim 1, wherein the $C_1$-$C_4$ organic acid or inorganic acid is selected from the group consisting of formic acid, acetic acid, propionic acid, butyric acid, hydrochloric acid, sulfuric acid, phosphoric acid and nitric acid.

5. A method according to claim 1, wherein the $C_1$-$C_8$ fatty-acid triglyceride is selected from the group consisting of glycerol-triformate, glycerol-triacetate (triacetin), glycerol-tripropionate, glycerol-tributyrate (tributyrin), glycerol-trivalerate (trivalerin), glycerol-tricaproate (tricaproin), glycerol-trihepanoate (triheptanoin), and glyceroltricaprylate (tricaprylin).

* * * * *